April 18, 1961   C. A. MILLS   2,980,544
METHOD OF HEATING MEAT
Filed Jan. 15, 1958

INVENTOR.
CLARENCE A. MILLS,
BY
ATTORNEYS.

United States Patent Office 2,980,544
Patented Apr. 18, 1961

2,980,544

METHOD OF HEATING MEAT

Clarence A. Mills, Cincinnati, Ohio, assignor to Reflectotherm, Inc., Cincinnati, Ohio, a corporation of Ohio Filed Jan. 15, 1958, Ser. No. 709,145

3 Claims. (Cl. 99—229)

In my application, Serial No. 651,029, filed April 5, 1957, now abandoned, I have disclosed a radiant heat ray emitter consisting of a housing coated on its outer surface with a carbon black coating and which, when heated to 200° to 500° F. by an electrical resistance unit which heats the housing will emit primarily ultra long infra red rays of wave lengths of from 30 to 400 microns. The rays are preferably focussed by a reflector through a plastic diaphragm such as cellophane which absorbs most of the infra red rays. This application is a continuation-in-part of this aforenoted application.

It is my object to utilize the principle of operation of my heat ray emitter for a heating oven preferably for heating non metallic materials such as meats as they move through the oven on a conveyor. My oven is concerned with deep penetration by ultra long infrared rays of wave lengths of from 30 to 400 microns and, as metallic products are not penetrated by these rays, is limited to the heating of non-metallic products. It is characteristic of the modification of my invention as disclosed herein that I do not employ a reflector for focusing the infra red rays. The rays are emitted from the entire surface of a carbon black coated plate. While I have illustrated a heating oven in which meats suspended by hooks from a chain conveyor enter the oven, which may be called a conveyorized heating tunnel, my invention includes ovens of non-conveyor types in which the products are inserted on movable supports which are withdrawn from the oven after the heating stage has been completed.

It is further my object to include in the combination disclosed herein mechanism for providing smoke within the oven for smoking the meats during the heating stage.

In the heating of meats or other non-metallic substances infrared rays of wave lengths of from 1 to 30 microns do not penetrate but only sear the surfaces. These seared surfaces prevent penetration by any infrared rays of wave lengths of from 30 to 400 microns which may be present. The interiors of the substances are heated by the conduction of the heat from the surfaces. This results in uneven heating. Infrared rays of wave lengths of from 30 to 400 microns, however, penetrate the entire interior of the meats or other nonmetallic substances and heat them uniformly throughout. Due to this uniform heating throughout the use of infrared rays of wave lengths of from 30 to 400 microns instead of infrared rays of wave lengths of from 1 to 30 microns reduces materially the length of time for which the meats or other non-metallic substances must be heated. Further, the effect of the smoke is more uniformly effective when the heating is uniform throughout than when only the surface is heated by the source of heat and the interior is heated by the conduction of the heat from the surface.

Heretofore no practical and inexpensive means have been devised for the emission of infrared rays which are primarily of wave lengths of from 30 to 400 microns.

My oven emits these infrared rays of wave lengths of from 30 to 400 microns by the employment of carbon black coated heating plates of a temperature between 200° and 500° F. There is a tendency for carbon atoms in the amorphous state (lampblack carbon-black) to associate in pairs, with the four active outer electrons of each carbon atom joining into a close lattice semi-crystalline structure (the so-called electron octet). In going from the freely active state into this octet lattice structure much of the previous energy of motion of the electrons is transmitted over into vibrational activity of the new molecules of the paired carbon atoms and this excess vibrational energy causes these molecules to emit definite quantums of energy in the 30 to 400 micron wave length range of ultra long infrared rays. This octet lattice structure can be converted back to the individual carbon atoms with freely active outer electrons by an energy or heat input from the hot plate sufficient to counterbalance the heat loss from its carbon blacked surfaces. Amorphous carbon black maintained within the temperature range of 200° to 500° F. thus acts as a continuous generator of ultra-long infrared radiations of wave lengths of from 30 to 400 microns as the carbon atoms associate into pairs time after time, with intervening dissociations back into the single carbon atom state under the influence of new heat energy supplied from the adjacent hot plates. Boron in the amorphous state behaves similarly but is far less available and far more expensive than carbon black.

In order to prevent any infrared rays from searing the surface of the substance being heated and thus preventing deep penetration, a cellophane filler is used which filters out a major portion of the infrared rays of wave lengths of from 1 to 30 microns.

The foregoing objects and other objects to which reference will be made in the following description, I accomplish by that combination and arrangement of parts of which I have disclosed a preferred embodiment.

Figure 1:
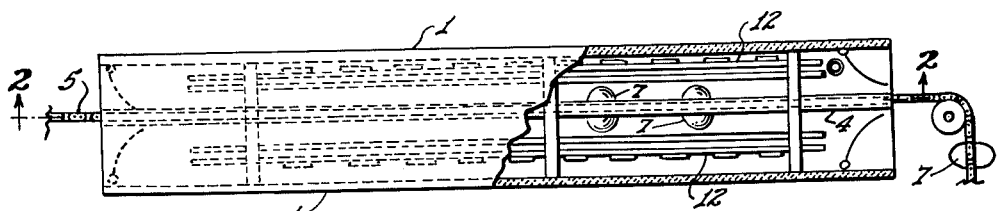
Figure 1 is a plan view with parts in section of a preferred tunnel arrangement.
Figure 2:
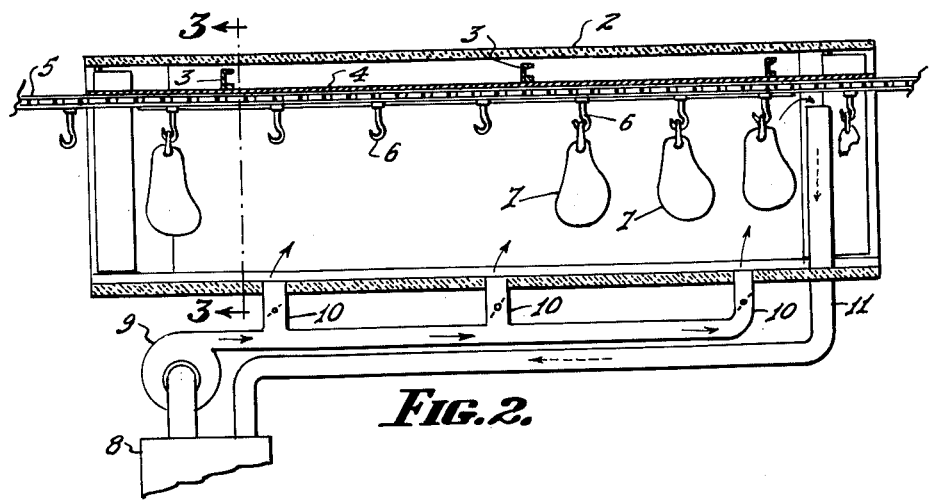
Figure 2 is a vertical section taken along the lines 2—2 in Figure 1.
Figure 3:
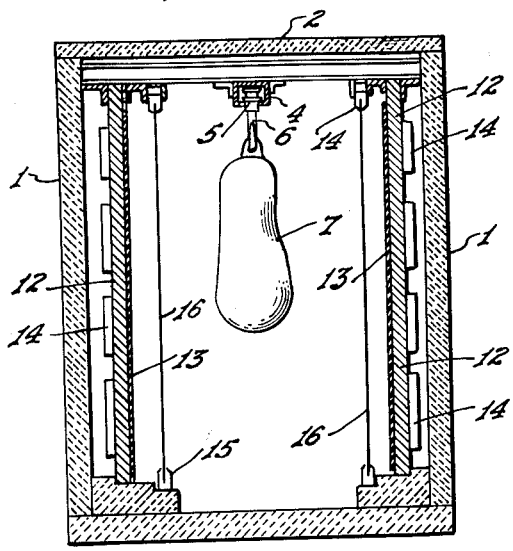
Figure 3 is a vertical section taken along the lines 3—3 in Figure 2.
Figure 4:
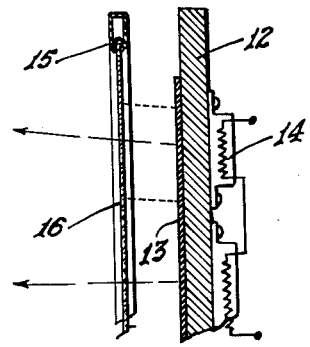
Figure 4 is a detail vertical section illustrating diagrammatically the heat ray emitting construction.

In the drawings the tunnel is enclosed by side walls 1 and a top cover 2. Extending across the tunnel are the bracing members 3 which support the bearing members 4 through which a conveyor chain 5 moves lengthwise of the tunnel. A series of hook members 6 are suspended from the conveyor chain on which I have indicated hams 7 which are processed during the passage of the hams through the tunnel.

For smoking the hams I have indicated a source of smoke 8 with a blower 9 and discharge conduits 10 through which the smoke is discharged into the conveyor chamber. The return for the smoke from the tunnel may be through a conduit 11 back to the smoke source.

The heating by means of ultra long infra red rays having wave lengths of from 30 to 400 microns is formed by a pair of metal plates 12 extending up parallel with the side walls 1. The surface facing the interior of the oven of each metal plate is coated with carbon black paint as indicated at 13, and heat of a temperature between 200° and 500° F. is applied to the plate by an electrical resistance unit 14 in back of the plate.

There is in front of each heat ray emitting plate a frame 15 within which is mounted a plastic sheet or panel 16 such as cellophane which is opaque to a major portion of the infrared rays of wave lengths of from 1 to 30 microns but which permits the passage of infrared rays of wave lengths of from 30 to 400 microns.

Modifications in the arrangement specifically disclosed will occur to those skilled in the art.

Having thus described my invention, what I claim as new and desire to secure by Letters Patent is:

1. A method of heating meats with deep penetrating infrared rays which consists in providing carbon black coated surfaces on metal plates spaced so as to permit conveyance of the meat therebetween and heating the metal plates to from 200° to 500° F. and filtering out with a cellophane filter a major portion of the short infared rays and permitting the passage of infrared rays of wave lengths of from 30 to 400 microns.

2. As a step in the method of heating meats which consists in the use of carbon black coated surfaces heated to a temperature of from 200° to 500° F. for the emission of infrared rays which are primarily of wave lengths of 30 to 400 microns.

3. As a step in the method of heating meats which consists in the use of carbon black coated surfaces heated to a temperature of from 200° to 500° F. for the emission of infrared rays which are primarily of wave lengths of 30 to 400 microns, and smoking the meats during the heating stage.

References Cited in the file of this patent
UNITED STATES PATENTS

| | | |
|---|---|---|
| 1,531,414 | Ruben | Mar. 31, 1925 |
| 1,581,519 | Robertson | Apr. 20, 1926 |
| 1,789,380 | Edwards et al. | Jan. 20, 1931 |
| 1,889,429 | Weingand et al. | Nov. 29, 1932 |
| 2,138,813 | Bemis | Dec. 6, 1938 |
| 2,275,745 | Eastman | Mar. 10, 1942 |
| 2,535,393 | Daugert | Dec. 26, 1950 |
| 2,571,218 | Del Buttero | Oct. 16, 1951 |
| 2,629,162 | Peck | Feb. 24, 1953 |

FOREIGN PATENTS

| | | |
|---|---|---|
| 160,486 | Great Britain | May 22, 1921 |
| 1,096,413 | France | Feb. 2, 1955 |

OTHER REFERENCES

Barber: "Industrial Application of Infrared," Electrical Engineering, September 1953, pages 764 to 769.